(12) United States Patent
Hall et al.

(10) Patent No.: US 6,454,469 B1
(45) Date of Patent: Sep. 24, 2002

(54) ACTIVELY ALIGNED OPTICAL COUPLING ASSEMBLY

(75) Inventors: Richard R. Hall, Endwell; How Tzu Lin, Vestal, both of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/343,071

(22) Filed: Jun. 29, 1999

(51) Int. Cl.[7] ............................. G02B 6/26; G02B 6/42
(52) U.S. Cl. ............................. 385/90; 385/89; 385/52
(58) Field of Search .......................... 385/88, 89, 90, 385/91, 92, 93, 94, 52

(56) References Cited

U.S. PATENT DOCUMENTS

| | | |
|---|---|---|
| 4,252,407 A | 2/1981 | Bubanko et al. |
| 5,191,629 A | 3/1993 | Kaiser |
| 5,208,888 A * | 5/1993 | Steinblatt et al. ............ 385/90 |
| 5,418,872 A | 5/1995 | Osaka et al. |
| 5,590,227 A | 12/1996 | Osaka et al. |
| 5,696,862 A | 12/1997 | Hauer et al. |
| 5,812,258 A | 9/1998 | Pierson |
| 6,243,508 B1 * | 6/2001 | Jewell et al. ................. 385/14 |
| 6,253,011 B1 * | 6/2001 | Haake ........................ 385/52 |

* cited by examiner

Primary Examiner—Frank G. Font
Assistant Examiner—Andrew H. Lee
(74) Attorney, Agent, or Firm—Salzman & Levy; Lawrence R. Fraley

(57) ABSTRACT

An optical coupling assembly is described that optically aligns an opto-electronic device, such as a Vertical Cavity Surface Emitting Laser (VCSEL) chip, with a fiber optic coupler upon a heatsink substrate. The assembly has a number of biasing elements that acts against the coupler to provide contact with mating surfaces. Adjustment devices, such as screws, acting against the coupler and biasing elements, are adjusted until the fiber optic transmitting elements of the coupler align with the opto-electronic device light emitting elements. Photodetectors disposed upon a distal end of the coupler receive the light from the opto-electronic device, and provide a mechanism to detect optimum alignment.

9 Claims, 2 Drawing Sheets

ACTIVELY ALIGNED OPTICAL COUPLING ASSEMBLY

FIELD OF THE INVENTION

This invention relates to fiber optic couplings and, more particularly, to an assembly that optically aligns an opto-electronic device, such as a Vertical Cavity Surface Emitting Laser (VCSEL) chip, with a fiber optic coupler upon a heatsink substrate.

BACKGROUND OF THE INVENTION

Owing to their small size, it is difficult to align opto-electronic devices to fiber optic couplers. The present invention comprises a specialized assembly that eliminates the need for exceptional equipment for aligning an opto-electronic device with the fiber bundles of a fiber optic coupler. The assembly comprises a supporting heatsink substrate for the device. The coupler that is to be aligned with the device is supported upon compliant members, such as elastomers, springs, flexures, etc., disposed within the heatsink substrate. The compliant members allow the coupler to move laterally within a housing. A number of mechanical adjustment devices, such as screws, carried by the housing can be adjusted to position the coupler with respect to the heatsink substrate that carries the device.

A flexible circuit that is attached to the device provides power and/or signals. The emitted light is transmitted through the fiber optic bundle of the coupler to a set of photodetectors plugged into a distal end of the coupler. The adjustment devices on the housing are moved until an acceptable alignment is achieved between the light emitting devices (e.g., lasers) and the fiber optic bundles. Once an optimum alignment is achieved, the device and the coupler are permanently affixed by an epoxy.

One of the unique aspects of this assembly is its ability to provide its own, self-contained alignment capability, without depending on additional complex fixturing.

DISCUSSION OF RELATED ART

In U.S. Pat. No. 4,252,407, issued to Bubanko et al on Feb. 24, 1981 for FIBRE-TO-FIBRE CONNECTOR FOR MULTIFIBRE CABLES, a fixture having a number of guide pins and fibre-retaining grooves is illustrated.

In U.S. Pat. No. 5,191,629, issued on Mar. 2, 1993 to Kaiser for LASER MODULE, a metal housing is illustrated in which a laser is supported. The laser is moved perpendicularly to its axis by adjusting screws. An optical waveguide is coaxially centered in the bore, axially adjusted, and then fixed in place.

In U.S. Pat. No. 5,418,872, issued on May 23, 1995 to Osaka et al for OPTICAL CONNECTOR CONNECTING APPARATUS AND OPTICAL CONNECTOR CONNECTING METHOD, an apparatus is illustrated wherein a plurality of fixed optical connectors is mounted in juxtaposition with an optical connector. The connector is moved orthogonally by a number of screw threads to correct its position.

In U.S. Pat. No. 5,696,862, issued to Haur et al on Dec. 9, 1997 for OPTICAL TRANSMITTING AND RECEIVING DEVICE HAVING A SURFACE-EMITTING LASER, a VCSEL is shown emitting light to a transmission fiber and a receiving element through a number of reflecting plates.

In U.S. Pat. No. 5,590,227, issued on Dec. 31, 1996 to Osaka et al for OPTICAL CONNECTOR APPARATUS, an apparatus is illustrated wherein a plurality of fixed optical connectors is mounted in juxtaposition with an optical connector. The connector is moved orthogonally by a number of screw threads to correct its position. A beam is flexed to provide fine positioning.

In U.S. Pat. No. 5,812,258, issued to Pierson on Sep. 23, 1998 for OPTICAL COUPLER AND ALIGNMENT APPARATUS WITH MULTIPLE ECCENTRIC ADJUSTMENTS, two eccentric sleeves are rotated to change either the angle or the location of the axis of one optical component relative to another optical component, for alignment. A bonding agent is introduced between the sleeves to fix the alignment permanently.

SUMMARY OF THE INVENTION

In accordance with the present invention, there is provided an optical coupling assembly and method of fabricating same. The optical coupling assembly comprises a heatsink substrate upon which is mounted an opto-electronic device, such as a VCSEL laser emitting element. A flexible circuit is attached to the circuitized device, and provides it with power. An outer housing comprises a number of adjustment devices for positioning a fiber optic coupler with respect to the optical paths. The outer housing also comprises a number of biasing elements that acts against the coupler, and biases it in the Y- and Z-axes. The adjustment devices are manipulated until the fiber optic transmitting elements of the coupler align with the receiving elements. Photodetectors plugged into a distal end of the coupler receive the light from the light transmitting device, and provide a means by which optimum alignment is achieved. A bonding medium is introduced to permanently align and fix the components in the proper orientation.

It is an object of this invention to provide an improved optical coupling assembly.

It is another object of the invention to provide an optical coupling assembly that has built-in alignment components.

It is still another object of the invention to provide such an optical coupling assembly with a heatsink.

BRIEF DESCRIPTION OF THE DRAWINGS

A complete understanding of the present invention may be obtained by reference to the accompanying drawing, when considered in conjunction with the subsequent detailed description, in which the FIGURE illustrates a perspective view of the optical coupling assembly of this invention, with the optical coupler and device shown in phantom view.

DESCRIPTION OF THE PREFERRED EMBODIMENT

Figure 1:
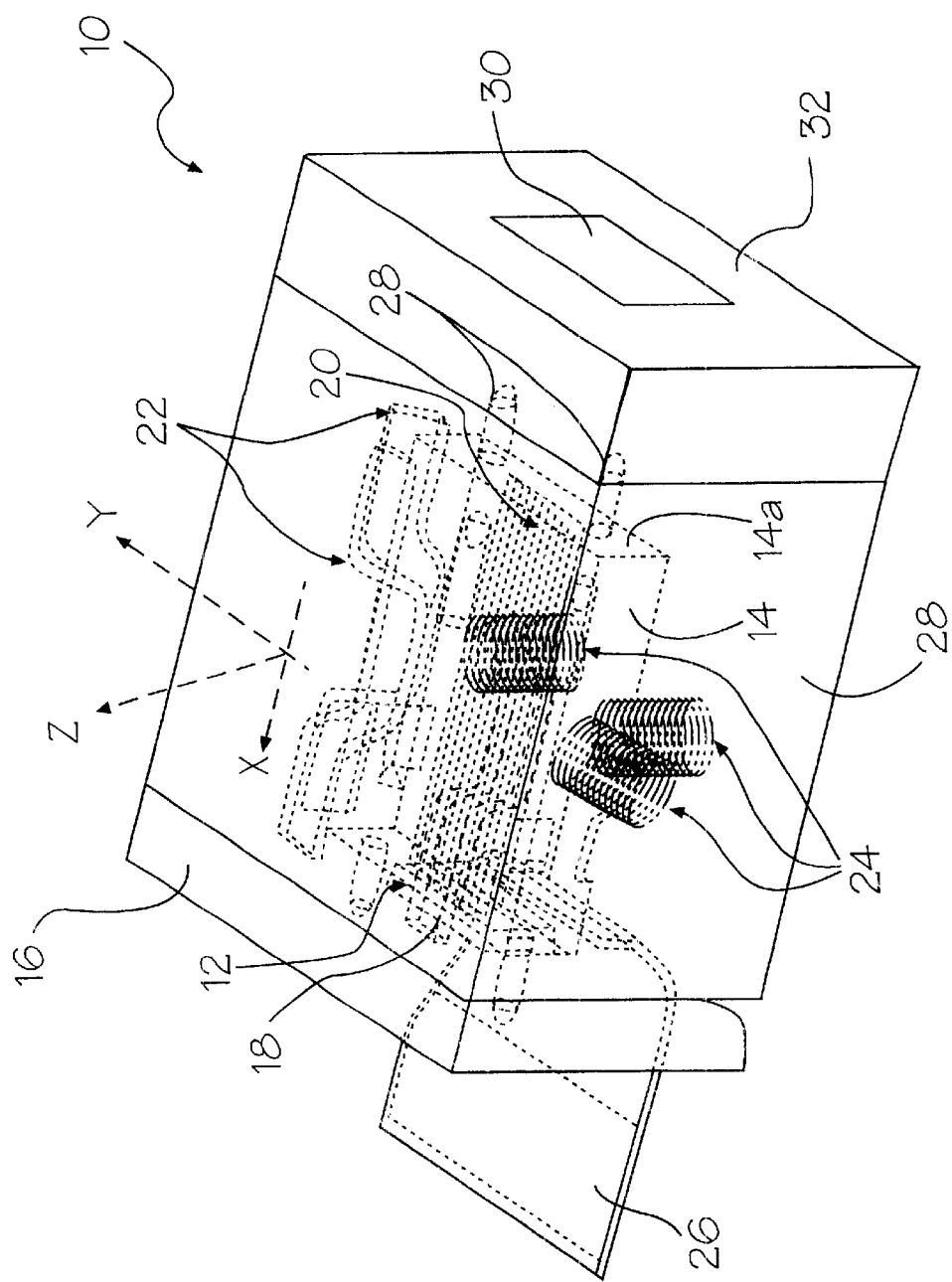
Figure 2:
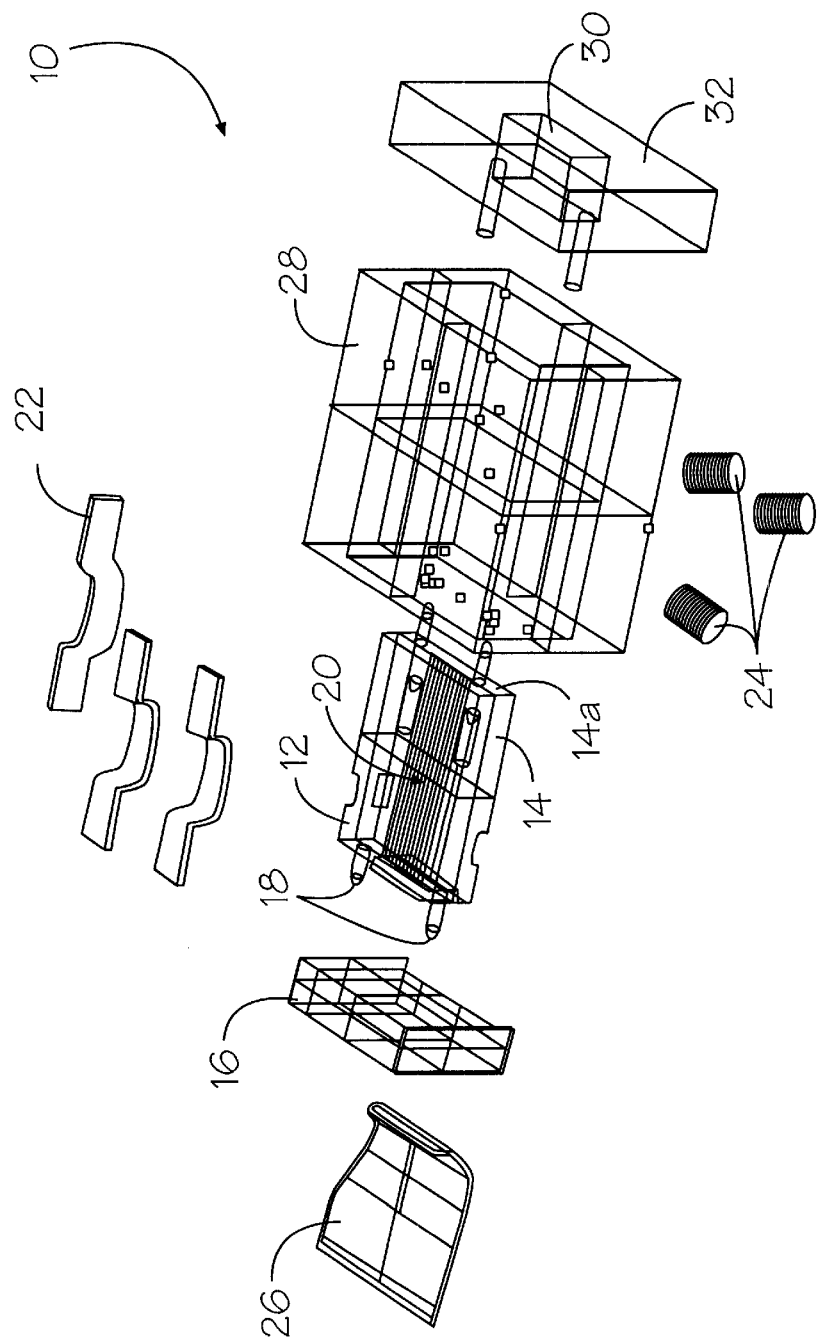

Generally speaking, the invention features an optical coupling assembly that optically aligns an opto-electronic device with a fiber optic coupler upon a heatsink substrate. The assembly comprises a number of biasing elements that acts against the coupler. Adjustment devices, acting against the coupler and biasing elements, are adjusted until the fiber optic transmitting elements of the coupler align with the desired optical paths. Photodetectors plugged into a distal end of the coupler receive the light from the opto-electronic device, and provide a means by which optimum alignment is detected.

Now referring to the FIGURE, the optical coupling assembly 10 of this invention is illustrated. The optical coupling assembly 10 optically aligns an opto-electronic device 12 with a fiber optic coupler 14 upon a heatsink substrate 16. In other words, light emitting members 18 of the device 12 are optically aligned with the fiber optic bundle 20 of the coupler 14.

The opto-electronic device can comprise a gallium arsenide chip.

In order to achieve optical alignment, the heatsink substrate 16 cooperates with compliant members, such as springs, elastomers or flexures 22 that act against the coupler 14, and bias it in the Y- and Z-axes of a housing 28 that supports the compliant members 22. Adjustment screws 24 or other suitable adjustment devices supported by the housing 28, are provided to contact the coupler 14 along respective Y- and Z-axes, and act against the compliant members 22. These screws 24 are manipulated until the fiber optic transmitting elements 20 of the coupler 14 align with the emitter elements 18. Photodetectors (not shown) are plugged into a distal end 14*a* of the coupler 14, by means of a port 30 disposed in an end cap 32, and receive the light from the opto-electronic device 12. Suitable compliant members (not shown) disposed on the end cap 32 provide pre-load to the coupler 14 against heatsink substrate 16 in the X direction.

It should be understood that the invention can work equally effectively when the coupler 14 is connected to a photodetector, instead of to the light emitting device 12, as shown. As can be seen from the foregoing description and the FIGURE, heatsink substrate 16 and housing 28 are connected to each other, allowing coupler 14 to float therebetween, prior to being permanently affixed.

The opto-electronic device 12 is powered by a flexible circuit 26. The light emitted from the light emitting lasers 18 of the device 12 provide a means by which optimum alignment is achieved. A suitable bonding medium permanently fixes the heatsink substrate 16 and the housing 28. In the course of this assembly procedure, the optical coupler 14 is also fixed to the aforementioned components 16, 28.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A self-aligning optical coupling assembly that requires no external alignment fixtures by reason that alignment capabilities are self-contained therein, comprising: a substrate for supporting an opto-electronic device having light emitting members, and a fiber optic coupler having a bundle of optical fibers to be optically aligned with said light emitting members of said opto-electronic device, biasing alignment means carried by said substrate being in planar contact with said fiber optic coupler, and a plurality of adjustment devices in moving contact with said fiber optic coupler, acting against said biasing alignment means for adjusting said fiber optic coupler with respect to said opto-electronic device, such that said light emitting members optically self-align with said bundle of optical fibers without the need for external alignment fixtures, and means operatively attached to said opto-electronic device for powering said light emitting members in order to detect light transmission for optimum alignment.

2. The optical coupling assembly in accordance with claim 1, wherein said substrate is a heatsink substrate.

3. The optical coupling assembly in accordance with claim 1, wherein said opto-electronic device is a gallium arsenide chip.

4. The optical coupling assembly in accordance with claim 1, wherein said biasing means comprises a plurality of compliant members respectively disposed along planar Y- and Z-axes.

5. The optical coupling assembly in accordance with claim 1, further comprising a number of photodetectors disposed adjacent said fiber optic bundle for detecting light being transmitted from said light emitting members.

6. A self-aligning optical coupling assembly, comprising: a substrate for supporting a opto-electronic device having light emitting members, and a fiber optic coupler having a bundle of optical fibers to be optically self-aligned with said light emitting members of said opto-electronic device, self-alignment biasing means carried by said substrate being in planar contact with said fiber optic coupler, and a plurality of adjustment devices in adjusting contact with said fiber optic coupler, acting against said self-alignment biasing means for adjusting said fiber optic coupler with respect to said opto-electronic device, such that said light emitting members optically align with said bundle of optical fibers, a flexible circuit operatively attached to said opto-electronic device for powering said light emitting members, and a number of photodetectors disposed adjacent said fiber optic bundle for detecting light being transmitted from said light emitting members in order to determine light transmission for optimum alignment between said opto-electronic device and said fiber optic coupler.

7. The optical coupling assembly in accordance with claim 6, wherein said substrate is a heatsink substrate.

8. The optical coupling assembly in accordance with claim 6, wherein said opto-electronic device is a gallium arsenide chip.

9. The optical coupling assembly in accordance with claim 6, wherein said self-alignment biasing means comprises a plurality of compliant members respectively disposed along planar Y- and Z-axes.

* * * * *